Patented Oct. 17, 1933

1,930,858

UNITED STATES PATENT OFFICE 1,930,858

MANUFACTURE OF TERTIARY ALKYLOL-ARYLAMINES

Werner Müller, Leipzig, Germany, assignor to General Aniline Works, Inc., New York, N. Y., a corporation of Delaware No Drawing. Application December 1, 1930, Serial No. 499,416, and in Germany February 18, 1930

19 Claims. (Cl. 260—128)

My present invention relates to an improvement in the manufacture of tertiary arylamines containing bound to the nitrogen an alkylol radicle.

In the prior art, it has been suggested by Gabel (Bulletin de la Société Chimique de France, 4 ser., vol. 41 (1927), page 936 and following) to act with ethylene oxide upon methyl or ethylaniline. Gabel employs 1 to 2 mols of ethylene oxide upon 1 mol of alkylaniline and he heats the reaction components on the boiling water bath in a closed vessel for about 10 hours. The yield of the base substituted on the nitrogen by alkylol obtained by Gabel, is 15 to 22 per cent of the theory. Now I have found that alkylol-alkylarylamines are easily obtainable in a technical unobjectionable manner when starting from the secondary alkylarylamines and their substitution products and from ethylene oxide and its homologues when allowing these components to react in a closed vessel at a temperature higher than 100° C. The yields obtained calculated on the alkylene oxide, are nearly theoretical. Preferably the reaction temperature is about 140 to 150° C. or even higher; in some cases, however, especially when higher homologues of the alkylene oxide are used, it is advantageous to heat the components not higher than 180° C., since otherwise the condensation may occur in another direction yielding undesired by-products.

This smooth formation of the tertiary bases, certainly, could not be foreseen, since this reaction occurs without addition of catalyzers and in absence of solvents and diluents. The calculated amounts of alkylene oxide and secondary base are poured together, the mixture is heated for a longer time to the reaction temperature in a closed vessel until the pressure in the vessel has decreased. Then the tertiary base is obtainable in a pure state by distillation in a vacuum.

Thus, under the simplest working conditions, valuable and for the greater part new tertiary bases are obtainable without difficulties and with excellent yields which may be used as intermediate products in the manufacture of dyes.

The following examples serve to illustrate my invention, the parts being by weight:—

*Example 1.*—149 parts of 1-(phenylamino) butane (n-butylaniline) are heated in a closed vessel for 4 to 6 hours to about 140 to 150° C. together with 44 parts of ethylene oxide. The reaction occurs according to the following equation:

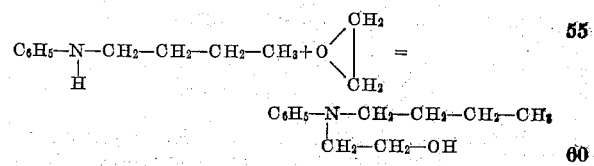

After cooling the 1-(phenylethylolamino) butane is obtained which after distillation in a vacuum forms a nearly colorless, very mobile liquid boiling at 160° C. under a pressure of 10 mm. mercury. The yield of the tertiary base obtained is about 190 to 192 parts.

*Example 2.*—149 parts of 1-(phenylamino) butane and 60 parts of propylene oxide (a technical mixture) are heated in a closed vessel for about 6 hours at 150° C., whereby 190 to 195 parts of 1-(phenylpropylolamino) butane are obtainable forming a nearly colorless liquid which boils at 153° C. under a pressure of 10 mm. mercury.

*Example 3.*—When starting from molecular quantites of ethylene of oxide and 1-(phenylamino)-2-methylpropane (iso-butylaniline) in an analogous manner 1-(phenyl-ethylolamino)-2-methylpropane of the formula

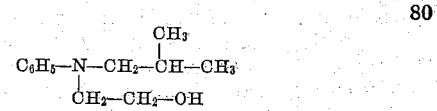

is obtainable.

This tertiary base boils at 153° C. under a pressure of 10 mm. mercury.

*Example 4.*—When starting from molecular quantities of ethylene oxide and 1-(phenylamino)-1-methylpropane, 1-(phenylethylolamino)-1-methylpropane of the formula

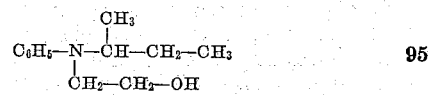

is obtainable boiling under a pressure of 10 mm. mercury at 152° C.

*Example 5.*—From molecular quantities of ethylene oxide and 1-(orthomethylphenylamino) butane the 1-(orthomethylphenylolamino) butane of the formula

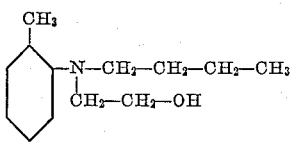

is obtainable boiling under a pressure of 10 mm. mercury at 148° C.

Example 6.—From molecular quantities of ethylene oxide and 1-(ethylamino) naphthalene one obtains the ethylol-ethyl-1-naphthylamine of the formula

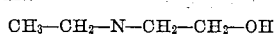
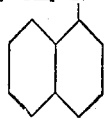

boiling at 187 to 188° C. under a pressure of 10 mm. mercury.

Example 7.—Molecular quantities of ethylene oxide and 2-(methylamino) naphthalene yield hydroxyethylmethyl-2-naphthylamine of the formula

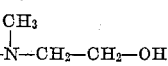

melting at 37–39° C.

Example 8.—Molecular quantities of propylene oxide (technical mixture) and cyclohexylaniline yield under the conditions mentioned above propylolcyclohexylaniline boiling at 176° C. under a pressure of 10 mm. mercury.

Example 9.—Molecular quantities of butylene oxide (technical mixture) and ethylaniline yield butylolethylaniline boiling at 142° C. under a pressure of 10 mm. mercury.

Example 10.—From molecular quantities of butylene oxide (technical mixture) and n-butylaniline one obtains butylol-n-butylaniline boiling at 160° C. under a pressure of 10 mm. mercury.

It is obvious that my present invention is not limited by the examples given above or by the specific details given therein.

As seen from Examples 1 and 2, I prefer to carry out the condensation at a temperature of about 140 to about 150° C. However, this temperature may be varied, if required, by the starting materials used. If necessary, the time of reaction may be altered, the end of the reaction, generally, is indicated by a decrease of the pressure in the reaction vessel.

Furthermore, it is obvious that I may use other starting materials, such as secondary arylamines substituted in the aryl nucleus by, for instance, halogen.

According to Example 8 a secondary amine may be used as starting material containing besides an aromatic radicle a closed chain hydrocarbon. In an analogous manner I may introduce the alkyl radicle into such secondary amines containing in their molecule two aromatic radicles such as, for instance, diphenylamine or dinaphthylamine.

According to Examples 6 and 7 I use as a starting material 1-(ethylamino)-naphthalene or 2-(methylamino)-naphthalene respectively. These starting materials may be replaced by other alkylaminonaphthalene compounds as, for instance, 1- or 2-propyl- or butylaminonaphthalene or the homologues thereof.

What I claim is:—

1. The process which comprises acting with an alkylene oxide in a closed vessel upon a secondary alkylarylamine at a temperature higher than 100° C. up to about 180° C.

2. The process which comprises acting with an alkylene oxide in a closed vessel upon a secondary alkylarylamine at about 140 to about 150° C.

3. The process which comprises acting with ethylene oxide in a closed vessel upon a secondary alkylarylamine at a temperature higher than 100° C. up to about 180° C.

4. The process which comprises acting with ethylene oxide in a closed vessel upon a secondary alkylarylamine at about 140 to about 150° C.

5. The process which comprises acting with a propylene oxide in a closed vessel upon a secondary alkylarylamine at a temperature higher than 100° C. up to about 180° C.

6. The process which comprises acting with a propylene oxide in a closed vessel upon a secondary alkylarylamine at about 140 to about 150° C.

7. The process which comprises acting with a butylene oxide in a closed vessel upon a secondary alkylarylamine at a temperature higher than 100° C. up to about 180° C.

8. The process which comprises acting with a butylene oxide in a closed vessel upon a secondary alkylarylamine at about 140 to about 150° C.

9. The process which comprises acting with an alkylene oxide in a closed vessel upon a secondary alkylarylamine of the benzene series at a temperature higher than 100° C. up to about 180° C.

10. The process which comprises acting with an alkylene oxide in a closed vessel upon a secondary alkylarylamine of the naphthalene series at a temperature higher than 100° C. up to about 180° C.

11. The process which comprises acting with ethylene oxide in a closed vessel upon (phenylamino)-butane at a temperature higher than 100° C. up to about 180° C.

12. The process which comprises acting with ethylene oxide in a closed vessel upon (phenylamino)-butane at about 140 to about 150° C.

13. As new products the compounds corresponding to the general formula

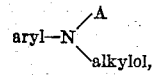

wherein A means a hydrocarbon radicle containing in its molecule at least 3 carbon atoms being in the pure state nearly colorless liquids which are distillable without decomposition under reduced pressure.

14. As new products the compounds corresponding to the general formula

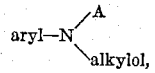

wherein A means an aliphatic hydrocarbon radicle containing in its molecule at least 3 carbon atoms being in the pure state nearly colorless liquids which are distillable without decomposition under reduced pressure.

15. As new products the compounds corresponding to the general formula

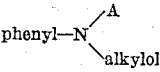

wherein A means an aliphatic hydrocarbon radicle containing in its molecule at least 3 car- 16. As new products the compounds corresponding to the general formula

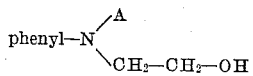

wherein A means a hydrocarbon radicle containing in its molecule at least 3 carbon atoms being in the pure state nearly colorless liquids which are distillable without decomposition under reduced pressure.

17. As new products the compounds corresponding to the general formula

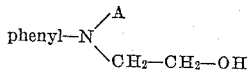

wherein A means an aliphatic hydrocarbon radicle containing in its molecule at least 3 carbon atoms being in the pure state nearly colorless liquids which are distillable without decomposition under reduced pressure.

18. As a new product 1-(phneyl-hydroxyethylamino)-butane corresponding to the formula

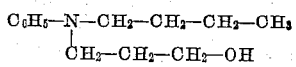

being in the pure state a very mobile, nearly colorless liquid, boiling at 160° C. under a pressure of 10 mm. mercury.

19. As new products the compounds corresponding to the general formula

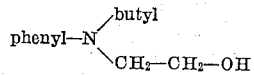

being in the pure state very mobile, nearly colorless liquids which are distillable without decomposition under reduced pressure.

WERNER MÜLLER.